UNITED STATES PATENT OFFICE.

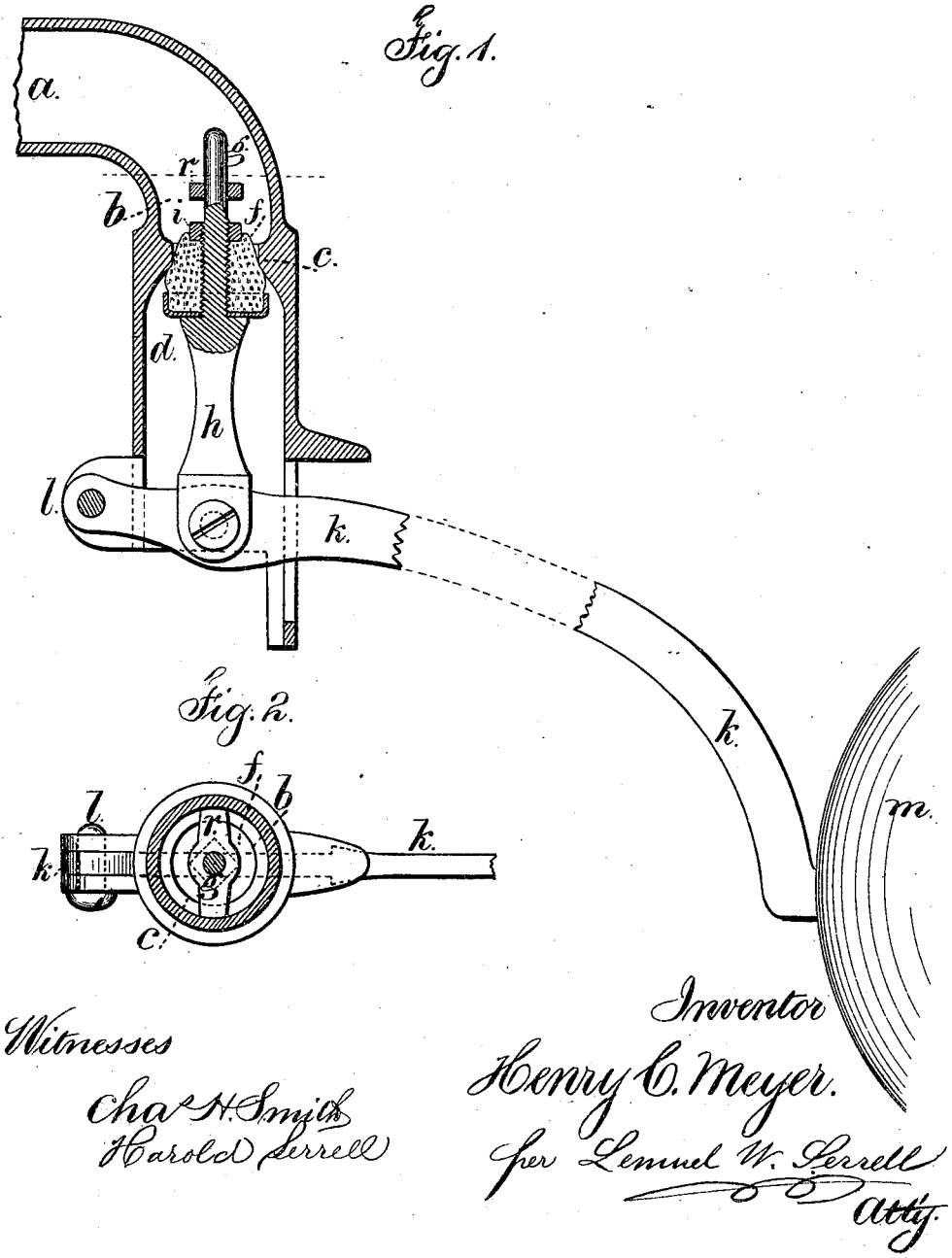

HENRY C. MEYER, OF NEW YORK, N. Y.

IMPROVEMENT IN TANK-REGULATORS.

Specification forming part of Letters Patent No. 178,656, dated June 13, 1876; application filed April 17, 1876.

*To all whom it may concern:*

Be it known that I, HENRY C. MEYER, of the city and State of New York, have invented an Improvement in Tank-Regulators, of which the following is a specification:

In Letters Patent No. 164,539, a tank-regulator is shown, in which the india-rubber valve is operated by a lever, and there are guide-arms projecting from the stem of the valve and sliding in the cylindrical water-way.

In the manufacture of this tank-regulator I have discovered that if one of the arms becomes broken or bent by any passing substance, the valve is not guided centrally, and there is a looseness of the spindle that allows the valve to vibrate and hammer against its seat, thereby making a very objectionable noise.

My present invention is an improvement upon the devices set forth in aforesaid Letters Patent, and consists in a guide-bridge applied in the water-way, in combination with the valve, lever, valve-seat, and cylindrical stem to the valve.

By this device the risk of the valve becoming loose and vibrating is removed, and the valve rendered more reliable in its action.

In the drawing, Figure 1 is a vertical section of the tank-regulator, and Fig. 2 is a plan of the valve and bridge.

The supply-pipe $a$, valve-seat $c$, valve-chamber $d$, india-rubber conical valve $f$, stem $g$, base $h$, lever $k$, float $m$, and lever-fulcrum $l$ are substantially the same as in the aforesaid patent, except that the stem $g$, instead of being made with a screw-thread its entire length, is made plain and cylindrical above the nut $i$. The water-way $b$ is provided with a stationary bridge, $r$, having a hole in it, through which the plain portion of the spindle $g$ slides freely but not loosely.

It will now be seen that the valve $f$ is guided in its movements by the bridge $r$ and lever $k$, jointly, and it is held so firmly in a central position in relation to the seat that there is no opportunity for the valve to vibrate against its seat as the regulator is opened or closed by the rise and fall of the water in the tank, causing the float to move the lever and valve, and in this manner the very objectionable noise sometimes made by such tank-regulators is avoided.

I claim as my invention—

The combination, with the elastic valve, lever, float, valve-seat and water-ways, of the tank-regulator, the cylindrical stem of the valve, and the stationary bridge, substantially as and for the purposes set forth.

Signed by me this 10th day of April, A. D. 1876.

HENRY C. MEYER.

Witnesses:
GEO. T. PINCKNEY,
GEO. D. WALKER.